United States Patent

Tojo

[11] 4,232,941
[45] Nov. 11, 1980

[54] OBJECTIVE LENS SYSTEM FOR MICROSCOPES

[75] Inventor: Tsutomu Tojo, Hachiouji, Japan

[73] Assignee: Olympus Optical Co., Ltd., Tokyo, Japan

[21] Appl. No.: 935,722

[22] Filed: Aug. 21, 1978

[30] Foreign Application Priority Data

Aug. 26, 1977 [JP] Japan .............................. 52-102357

[51] Int. Cl.³ .............................................. G02B 9/62
[52] U.S. Cl. ............................... 350/175 ML; 350/215
[58] Field of Search ................ 350/175 ML, 176, 177, 350/215

[56] References Cited

U.S. PATENT DOCUMENTS

| 3,572,902 | 3/1971 | Vetake | 350/215 X |
| 3,925,910 | 12/1975 | Matsubara | 350/177 X |

*Primary Examiner*—Paul A. Sacher
*Attorney, Agent, or Firm*—Cushman, Darby & Cushman

[57] ABSTRACT

An objective lens system for microscopes which has a large numerical aperture and a long working distance and wherein the secondary spectrum is sufficiently minimized and curvature of field, coma, etc. are favorably corrected over a wide range of visual field. Said objective lens system comprises a first single-element or cemented doublet lens component and at least three lens components, i.e., two cemented meniscus lens components so arranged as to face their concave surfaces each other and a cemented three-element lens component.

7 Claims, 6 Drawing Figures

OBJECTIVE LENS SYSTEM FOR MICROSCOPES

BACKGROUND OF THE INVENTION (a) Field of the Invention

The present invention relates to a Gauss type apochromat objective lens system for microscopes.

(b) Description of the Prior Art

In the conventional objective lens systems for microscopes, there is known a Gauss type lens system comprising two meniscus lens components which are so arranged as to face their concave surfaces each other. Further, there is also known a lens system comprising a cemented triplet lens component which is made of an extraordinarily dispersive material for minimizing secondary spectrum.

However, there have hitherto been known few objective lens systems which assure flat image plane for ultra wide visual field, a long working distance and a large numerical aperture. Further, correction of chromatic aberration has posed a difficult problem in such an objective lens systems.

SUMMARY OF THE INVENTION

It is, therefore, a primary object of the present invention is to provide an objective lens system for microscopes which has a numerical aperture larger than those of the conventional Gauss type objective lens systems and a long working distance, and wherein the secondary spectrum is sufficiently minimized and curvature of field, coma, etc. are favorably corrected within a wide range up to visual field number of approximately 30.

Figure 1:
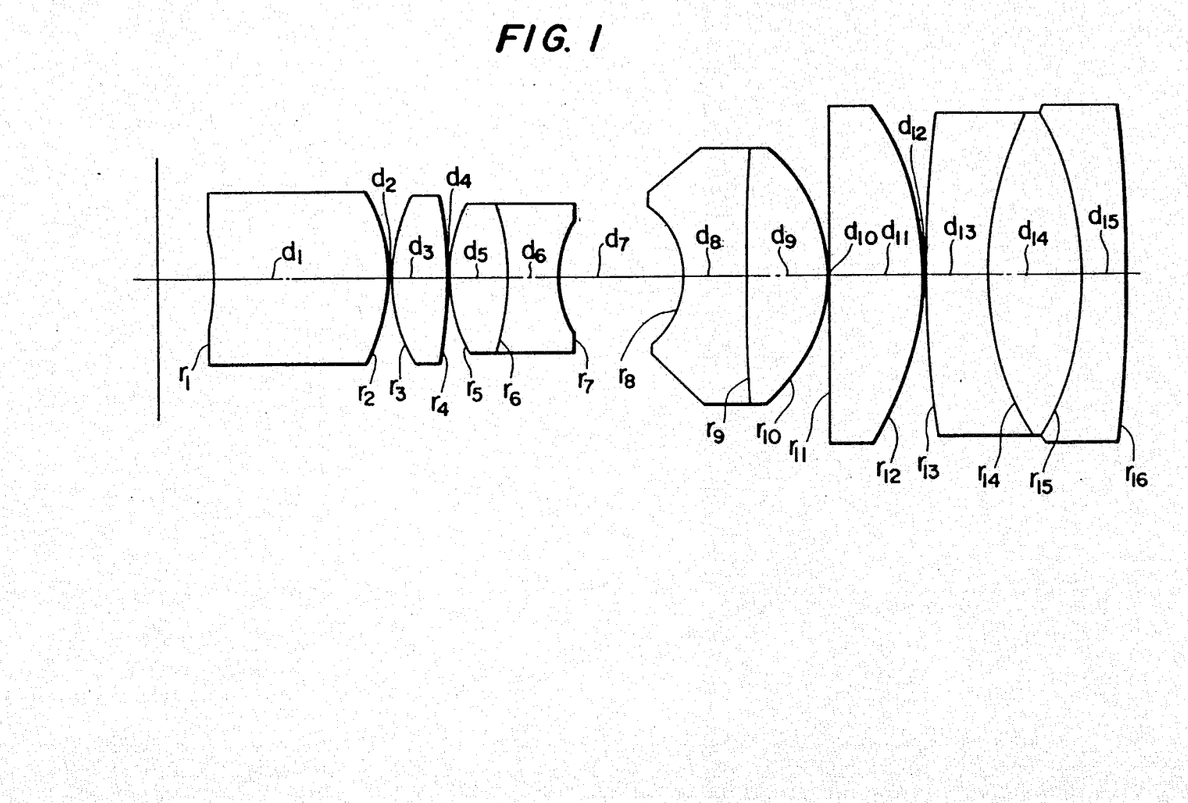
FIG. 1 shows a sectional view illustrating the composition of the objective lens system for microscopes according to the present invention.
Figure 2:
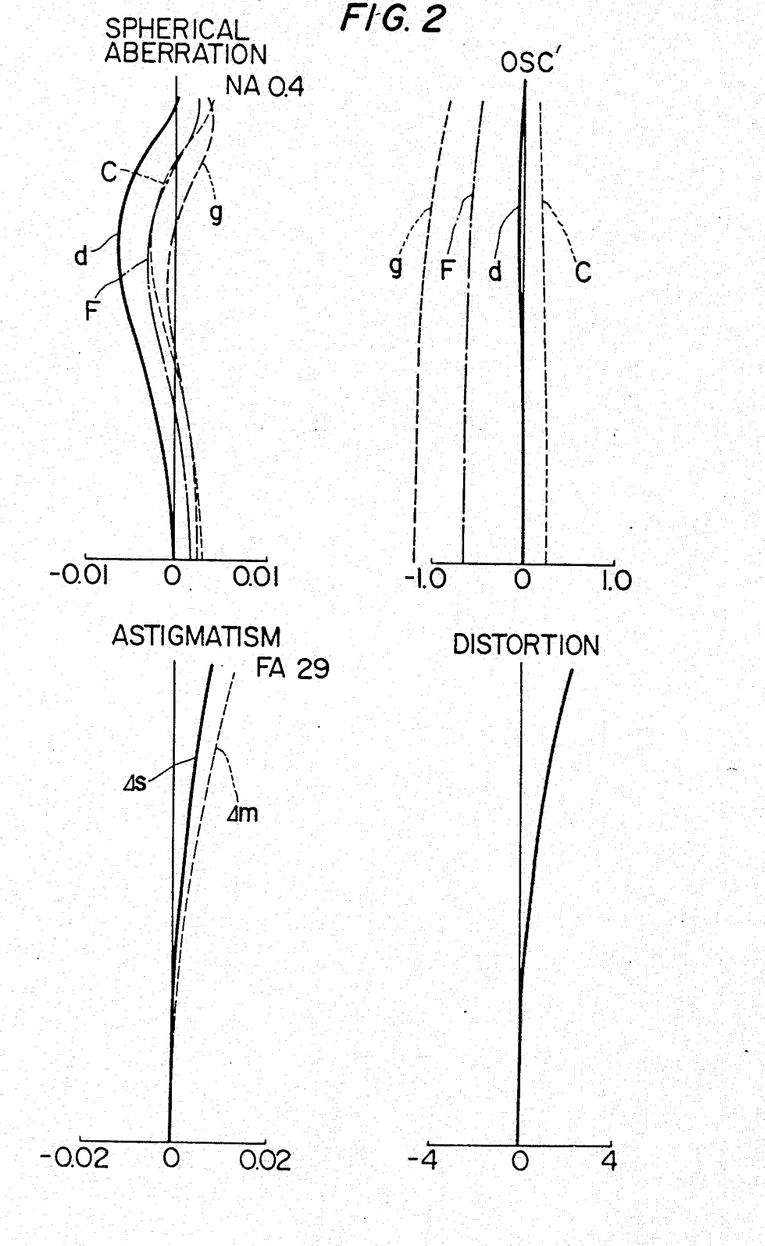
FIG. 2 shows graphs illustrating the aberration characteristics of the Embodiment 1.
Figure 3:
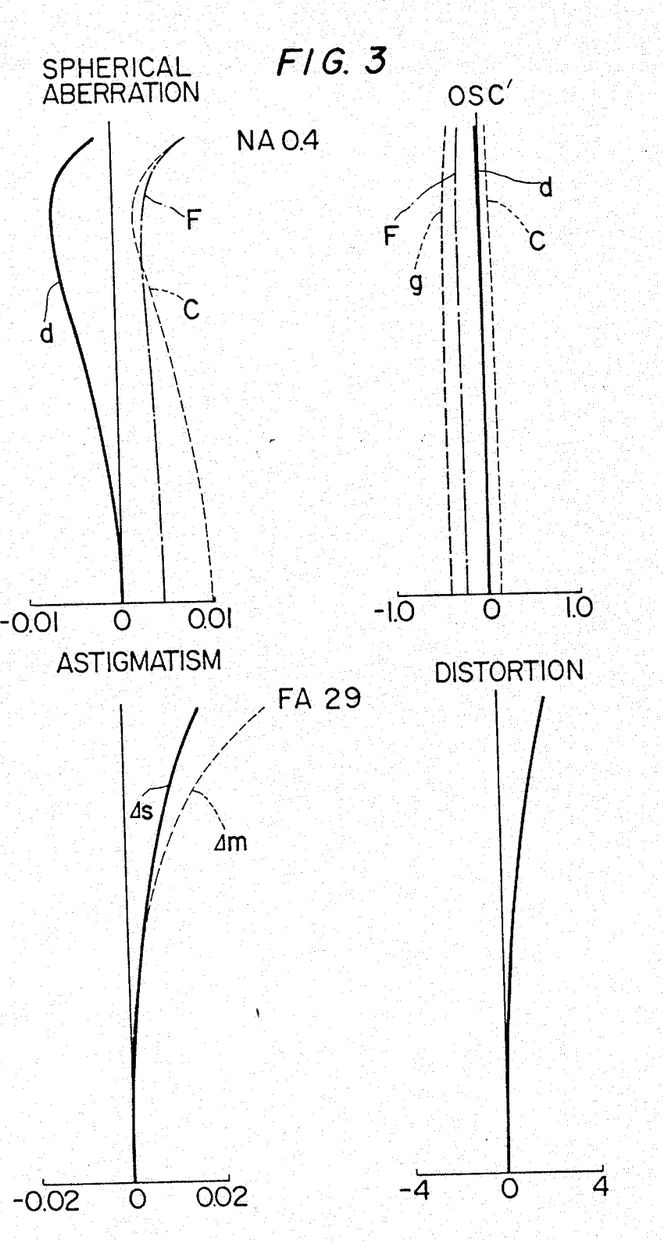
FIG. 3 shows graphs illustrating the aberration characteristics of the Embodiment 2.
Figure 4:
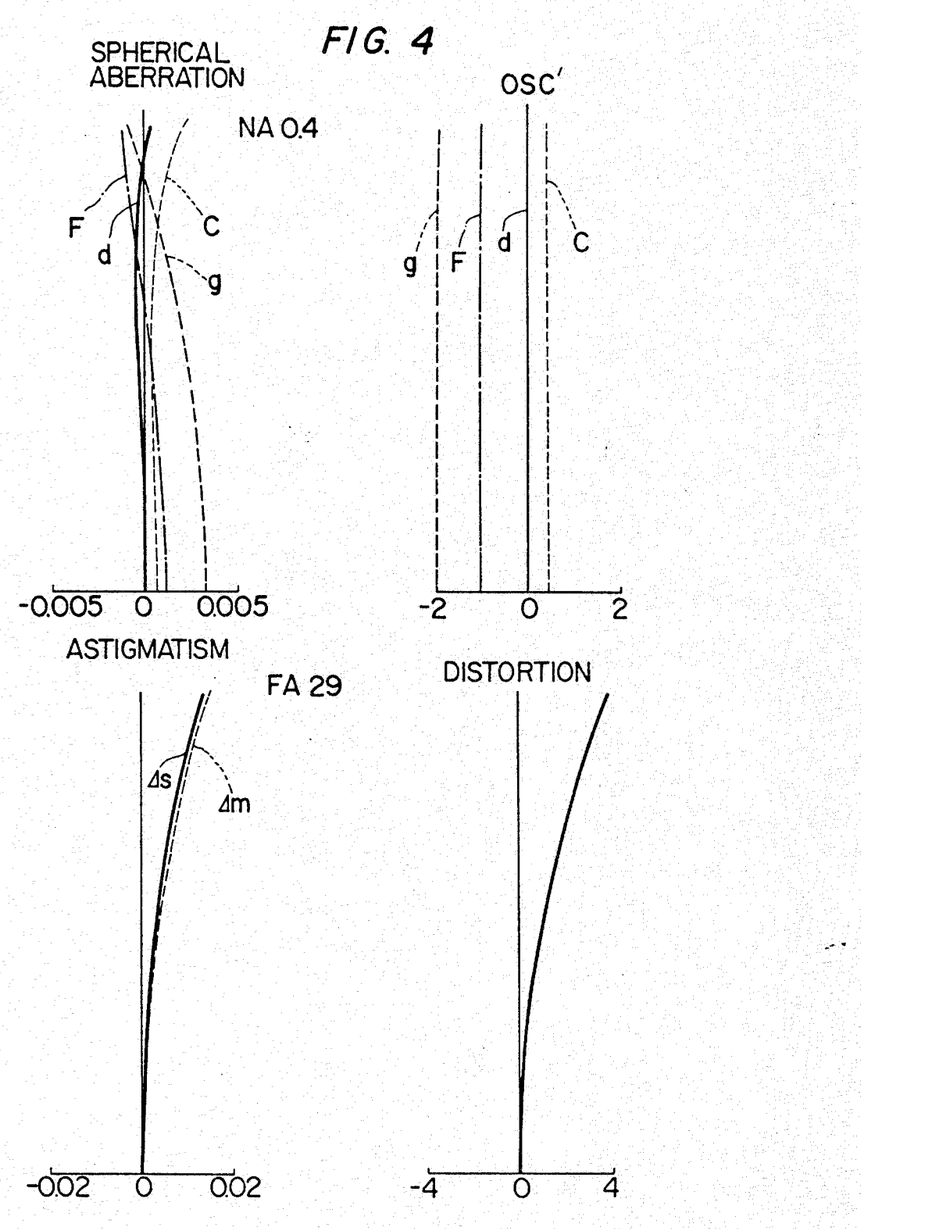
FIG. 4 illustrates curves visualizing the aberration characteristics of the Embodiment 3.
Figure 5:
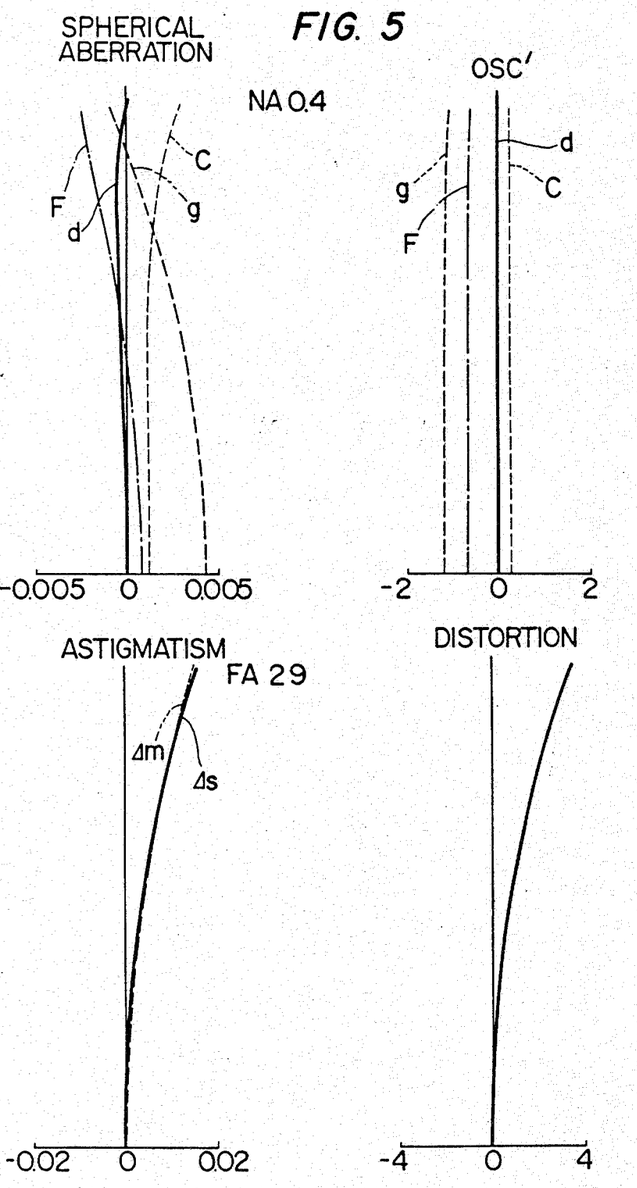
FIG. 5 illustrates curves visualizing the aberration characteristics of the Embodiment 4.
Figure 6:
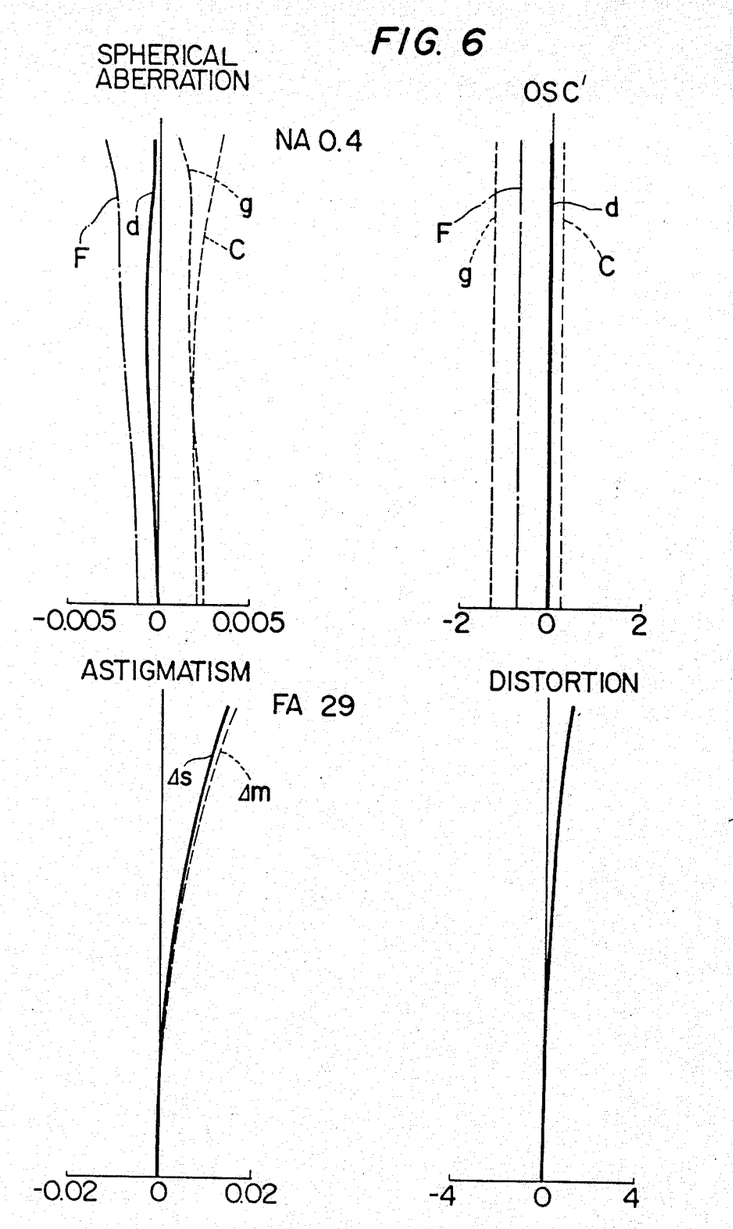
FIG. 6 illustrates curves visualizing the aberration characteristics of the Embodiment 5.

Another object of the present invention is to provide an objective lens system for microscopes which comprises a first positive single-element or cemented doublet lens component having a concave surface on the object side, and at least three lens components, i.e., two second and later cemented meniscus lens components which are so arranged as to face their concave surfaces each other and a cemented three-element lens component. The lens system according to the present invention has such a composition as shown in FIG. 1 and comprises a first positive meniscus lens component having a concave surface on the object side, a second positive lens component, a third cemented meniscus lens component having a concave surface facing the fourth lens component, a fourth cemented meniscus lens component having a concave surface facing said third lens component, a fifth positive lens component and a sixth cemented three-element lens component. The objective lens system according to the present invention is characterized in that it satisfies the conditions mentioned below:

$$n_1 > 1.70 \quad (1)$$

$$70 \leq (\nu_3 - \nu_4) + (\nu_6 - \nu_5) \leq 120 \quad (2)$$

$$\frac{\theta_4 - \theta_3}{\nu_3 - \nu_4} \leq 0.001, \quad \frac{\theta_5 - \theta_6}{\nu_6 - \nu_5} \leq 0.001 \quad (3)$$

$$0.1f < d_1/n_1 < 0.4f \quad (4)$$

wherein the reference symbols represent as defined below:

$n_1$: refractive index of the first lens component $\nu_3, \nu_4, \nu_5, \nu_6$: Abbe's numbers of the lens elements of the third and fourth lens components $\theta_3, \theta_4, \theta_5, \theta_6$: values given by $\theta = (n_g - n_F)/(n_F - n_C)$ for the elements of the third and fourth lens components respectively $d_1$: thickness of the first lens component $f$: focal length of the lens system as a whole The first lens component is made of a highly refractive glass material as defined by the condition (1) for the purpose of minimizing spherical aberration which is aggravated by selecting a large aperture and relieving the second and later lens components from the burden to correct spherical aberration. If $n_1$ deviates from the range defined by the condition (1), spherical aberration produced by the first lens component will be aggravated to result in adverse effect.

The condition (2) has been adopted to properly balance longitudinal chromatic aberration with lateral chromatic aberration in the entire lens system by designing the lens components having concave surface facing each other as achromatic lenses. Speaking concretely, longitudinal chromatic aberration and lateral chromatic aberration have been corrected in the entire lens system according to the present invention by selecting Abbe's number so as to satisfy the condition (2) for each element of the third and fourth cemented lens components. If the upper limit of the condition (2) is exceeded, longitudinal chromatic aberration will be overcorrected for short-wavelength ray of the marginal rays when lateral chromatic aberration is corrected sufficiently, whereby flare is produced on image to degrade image contrast. If $(\nu_3 - \nu_4) + (\nu_6 - \nu_5)$ is smaller than the lower limit of the condition (2), in constrast, lateral chromatic aberration will be remarkably undercorrected when longitudinal chromatic aberration is corrected favorably.

The condition (3) is required to minimize the secondary spectrum of chromatic aberration which remarkably degrades resolution at the center of image. Speaking concretely, the secondary spectrum is minimized and adverse influence on image due to chromatic aberration is eliminated by using a glass having a high partial dispersion ratio as material for the convex lens elements and a glass having a low partial dispersion ratio as material for the concave elements of the cemented meniscus lens components so arranged as to face their concave surfaces each other. Deviation from the range defined by the condition (3) will make it impossible to minimize the secondary spectrum.

The condition (4) is defined for favorably correcting curvature of field and coma. If $d_1/n_1$ exceeds the upper limit of the condition (4), in contrast, curvature of field will be overcorrected and coma will be undercorrected.

The objective lens system for microscopes according to the present invention can further be improved by so designing it as to satisfy the following conditions additionally:

$$0.25 < r_7/r_5 < 0.9 \quad (5)$$

$$0.25 < r_8/r_{10} < 0.9$$

$$0.5 \leq \left(\frac{n_1 - 1}{-r_1}\right) f \leq 5 \quad (6)$$

wherein the reference symbols represent as defined below:

$r_1, r_5, r_7, r_8$ and $r_{10}$: radii of curvature on the object side surface of the first lens component, the object side surface and image side surface of the third lens component, the object side surface and image side surface of the fourth lens component respectively.

The condition (5) is required for correcting curvature of field and astigmatic difference by properly adjusting Petzval's sum. If $r_7/r_5$ and/or $r_8/r_{10}$ exceed the upper limit of the condition (5), curvature of field will be overcorrected and zonal aberration will be aggravated. If $r_7/r_5$ and/or $r_8/r_{10}$ are smaller than the lower limit of the condition (5), in contrast, curvature of field and astigmatism will be undercorrected.

If $(n_1-1/-r_1)f$ is smaller than the lower limit of the condition (6), astigmatic difference will be undercorrected and cannot be corrected favorably by the fourth and later lens components. In such a case, zonal aberration will be aggravated remarkably and, in addition, working distance will be too short for convenient practical use. If $(n_1-1/-r_1)f$ is larger than the upper limit of the condition (6), in contrast, correcting power will be insufficient for curvature of field, thereby making it impossible to obtain ultra wide visual field up to field number of 30.

DETAILED DESCRIPTION OF THE PREFERRED EMBODIMENTS

Now, some preferred embodiments of the objective lens system for microscopes according to the present invention will be described detailedly with reference to the accompanying drawings.

---

Embodiment 1

$f = 1.0$  N.A. $= 0.4$  $\beta = -10X$  W.D $= 0.1329$ $r_1 = -0.5294$
$d_1 = 0.4089$  $n_1 = 1.78472$  $\nu_1 = 25.71$
$r_2 = -0.4305$
$d_2 = 0.0109$
$r_3 = 0.4276$
$d_3 = 0.1254$  $n_2 = 1.49700$  $\nu_2 = 81.60$
$r_4 = 1.1198$
$d_4 = 0.0055$
$r_5 = 9.3756$
$d_5 = 0.1336$  $n_3 = 1.43389$  $\nu_3 = 95.15$
$r_6 = -0.5628$
$d_6 = 0.1189$  $n_4 = 1.74000$  $\nu_4 = 31.70$
$r_7 = 0.2541$
$d_7 = 0.2950$
$r_8 = 0.2112$
$d_8 = 0.1472$  $n_5 = 1.61340$  $\nu_5 = 43.84$
$r_9 = 6.7503$
$d_9 = 0.1854$  $n_6 = 1.49700$  $\nu_6 = 81.60$
$r_{10} = -0.3958$
$d_{10} = 0.0055$
$r_{11} = \infty$
$d_{11} = 0.2170$  $n_7 = 1.70154$  $\nu_7 = 41.10$
$r_{12} = -0.7421$
$d_{12} = 0.0055$
$r_{13} = 2.8442$
$d_{13} = 0.1439$  $n_8 = 1.64250$  $\nu_8 = 58.37$

---

-continued

Embodiment 1

$r_{14} = 0.8101$
$d_{14} = 0.2181$  $n_9 = 1.43389$  $\nu_9 = 95.15$
$r_{15} = -0.8301$
$d_{15} = 0.1058$  $n_{10} = 1.61340$  $\nu_{10} = 43.84$
$r_{16} = -3.5977$
$\theta_3 = 0.5373$  $\theta_4 = 0.5919$  $\theta_5 = 0.5623$  $\theta_6 = 0.539$
$\dfrac{\theta_4 - \theta_3}{\nu_3 - \nu_4} = 0.000861$   $\dfrac{\theta_5 - \theta_6}{\nu_6 - \nu_5} = 0.000617$

---

Embodiment 2

$f = 1.0$  N.A. $= 0.4$  $\beta = -10X$  W.D $= 0.0594$ $r_1 = -0.3134$
$d_1 = 0.3334$  $n_1 = 1.83400$  $\nu_1 = 37.19$
$r_2 = -0.3221$
$d_2 = 0.0047$
$r_3 = 0.3980$
$d_3 = 0.0689$  $n_2 = 1.61800$  $\nu_2 = 63.38$
$r_4 = -1.3758$
$d_4 = 0.0047$
$r_5 = 0.3176$
$d_5 = 0.1139$  $n_3 = 1.43389$  $\nu_3 = 95.15$
$r_6 = -0.5555$
$d_6 = 0.1749$  $n_4 = 1.74000$  $\nu_4 = 31.70$
$r_7 = 0.1767$
$d_7 = 0.2366$
$r_8 = -0.2089$
$d_8 = 0.1682$  $n_5 = 1.61340$  $\nu_5 = 43.84$
$r_9 = 1.0102$
$d_9 = 0.0913$  $n_6 = 1.49700$  $\nu_6 = 81.60$
$r_{10} = -0.4309$
$d_{10} = 0.0248$
$r_{11} = 5.0559$
$d_{11} = 0.1263$  $n_7 = 1.53256$  $\nu_7 = 45.91$
$r_{12} = -0.4836$
$d_{12} = 0.0047$
$r_{13} = 6.7301$
$d_{13} = 0.1942$  $n_8 = 1.61340$  $\nu_8 = 43.84$
$r_{14} = 0.6681$
$d_{14} = 0.2792$  $n_9 = 1.43389$  $\nu_9 = 95.15$
$r_{15} = -2.1199$
$d_{15} = 0.1015$  $n_{10} = 1.61340$  $\nu_{10} = 43.84$
$r_{16} = -1.2523$
$\theta_3 = 0.5373$  $\theta_4 = 0.5919$  $\theta_5 = 0.5623$  $\theta_6 = 0.539$
$\dfrac{\theta_4 - \theta_3}{\nu_3 - \nu_4} = 0.000861$   $\dfrac{\theta_5 - \theta_6}{\nu_6 - \nu_5} = 0.000617$

---

Embodiment 3

$f = 1.0$  N.A. $= 0.4$  $\beta = -10X$  W.D. $= 0.0988$ $r_1 = -0.3679$
$d_1 = 0.2882$  $n_1 = 1.78472$  $\nu_1 = 25.71$
$r_2 = -0.3149$
$d_2 = 0.0048$
$r_3 = 0.5580$
$d_3 = 0.0703$  $n_2 = 1.49700$  $\nu_2 = 81.60$
$r_4 = -0.6240$
$d_4 = 0.0048$
$r_5 = 0.2822$
$d_5 = 0.1176$  $n_3 = 1.43389$  $\nu_3 = 95.15$
$r_6 = -0.8253$
$d_6 = 0.1755$  $n_4 = 1.74000$  $\nu_4 = 31.70$
$r_7 = 0.1871$
$d_7 = 0.2453$
$r_8 = -0.1766$
$d_8 = 0.1619$  $n_5 = 1.61340$  $\nu_5 = 43.84$
$r_9 = 2.9619$
$d_9 = 0.1101$  $n_6 = 1.49700$  $\nu_6 = 81.60$
$r_{10} = -0.3457$
$d_{10} = 0.0520$
$r_{11} = -2.9619$
$d_{11} = 0.1251$  $n_7 = 1.63930$  $\nu_7 = 44.88$
$r_{12} = -0.5082$
$d_{12} = 0.0048$
$r_{13} = 3.4302$ -continued

Embodiment 3

| | | |
|---|---|---|
| $d_{13} = 0.1942$ | $n_8 = 1.61340$ | $\nu_8 = 43.84$ |
| $r_{14} = 0.9256$ | | |
| $d_{14} = 0.2818$ | $n_9 = 1.43389$ | $\nu_9 = 95.15$ |
| $r_{15} = -0.7013$ | | |
| $d_{15} = 0.0934$ | $n_{10} = 1.61340$ | $\nu_{10} = 43.84$ |
| $r_{16} = -1.6404$ | | |

$\theta_3 = 0.5373 \quad \theta_4 = 0.5919 \quad \theta_5 = 0.5623 \quad \theta_6 = 0.539$ $\dfrac{\theta_4 - \theta_3}{\nu_3 - \nu_4} = 0.000861 \qquad \dfrac{\theta_5 - \theta_6}{\nu_6 - \nu_5} = 0.000617$

Embodiment 4

| $f = 1.0$ | N.A $= 0.4$ | $\beta = -10X$ | W.D $= 0.1316$ |
|---|---|---|---|
| $r_1 = -0.4015$ | | | |
| $d_1 = 0.2700$ | $n_1 = 1.83400$ | $\nu_1 = 37.19$ | |
| $r_2 = -0.3474$ | | | |
| $d_2 = 0.0047$ | | | |
| $r_3 = 0.7427$ | | | |
| $d_3 = 0.0698$ | $n_2 = 1.61800$ | $\nu_2 = 63.38$ | |
| $r_4 = -0.6625$ | | | |
| $d_4 = 0.0047$ | | | |
| $r_5 = 0.2833$ | | | |
| $d_5 = 0.1168$ | $n_3 = 1.43389$ | $\nu_3 = 95.15$ | |
| $r_6 = -0.9889$ | | | |
| $d_6 = 0.1889$ | $n_4 = 1.74000$ | $\nu_4 = 31.70$ | |
| $r_7 = 0.1889$ | | | |
| $d_7 = 0.2347$ | | | |
| $r_8 = -0.1799$ | | | |
| $d_8 = 0.1720$ | $n_5 = 1.61340$ | $\nu_5 = 43.84$ | |
| $r_9 = 3.1662$ | | | |
| $d_9 = 0.1213$ | $n_6 = 1.49700$ | $\nu_6 = 81.60$ | |
| $r_{10} = -0.3677$ | | | |
| $d_{10} = 0.0654$ | | | |
| $r_{11} = -3.0360$ | | | |
| $d_{11} = 0.1334$ | $n_7 = 1.63930$ | $\nu_7 = 44.88$ | |
| $r_{12} = -0.5407$ | | | |
| $d_{12} = 0.0047$ | | | |
| $r_{13} = 3.2530$ | | | |
| $d_{13} = 0.1903$ | $n_8 = 1.61340$ | $\nu_8 = 43.84$ | |
| $r_{14} = 0.8986$ | | | |
| $d_{14} = 0.2815$ | $n_9 = 1.43389$ | $\nu_9 = 95.15$ | |
| $r_{15} = -0.8299$ | | | |
| $d_{15} = 0.0976$ | $n_{10} = 1.61340$ | $\nu_{10} = 43.84$ | |
| $r_{16} = -1.8259$ | | | |

$\theta_3 = 0.5373 \quad \theta_4 = 0.5919 \quad \theta_5 = 0.5623 \quad \theta_6 = 0.539$ $\dfrac{\theta_4 - \theta_3}{\nu_3 - \nu_4} = 0.000861 \qquad \dfrac{\theta_5 - \theta_6}{\nu_6 - \nu_5} = 0.000617$

Embodiment 5

| $f = 1.0$ | N.A $= 0.4$ | $\beta = -10X$ | W.D $= 0.1859$ |
|---|---|---|---|
| $r_1 = -0.5430$ | | | |
| $d_1 = 0.2793$ | $n_1 = 1.83400$ | $\nu_1 = 37.19$ | |
| $r_2 = -0.4589$ | | | |
| $d_2 = 0.0052$ | | | |
| $r_3 = 0.6334$ | | | |
| $d_3 = 0.0775$ | $n_2 = 1.68600$ | $\nu_2 = 49.16$ | |
| $r_4 = -1.0351$ | | | |
| $d_4 = 0.0052$ | | | |
| $r_5 = 0.3401$ | | | |
| $d_5 = 0.1293$ | $n_3 = 1.43389$ | $\nu_3 = 95.15$ | |
| $r_6 = -0.9055$ | | | |
| $d_6 = 0.2021$ | $n_4 = 1.74000$ | $\nu_4 = 31.70$ | |
| $r_7 = 0.2134$ | | | |
| $d_7 = 0.2448$ | | | |
| $r_8 = -0.1940$ | | | |
| $d_8 = 0.1668$ | $n_5 = 1.61340$ | $\nu_5 = 43.84$ | |
| $r_9 = 2.6890$ | | | |
| $d_9 = 0.1160$ | $n_6 = 1.49250$ | $\nu_6 = 81.90$ | |
| $r_{10} = -0.3873$ | | | |
| $d_{10} = 0.0447$ | | | |
| $r_{11} = -5.5255$ | | | |
| $d_{11} = 0.1243$ | $n_7 = 1.74100$ | $\nu_7 = 52.68$ | |
| $r_{12} = -0.5503$ | | | |
| $d_{12} = 0.0052$ | | | |

-continued

Embodiment 5

| $r_{13} = 3.6196$ | | |
|---|---|---|
| $d_{13} = 0.2084$ | $n_8 = 1.64250$ | $\nu_8 = 58.37$ |
| $r_{14} = 0.7744$ | | |
| $d_{14} = 0.3113$ | $n_9 = 1.49700$ | $\nu_9 = 81.60$ |
| $r_{15} = -0.4793$ | | |
| $d_{15} = 0.1068$ | $n_{10} = 1.50847$ | $\nu_{10} = 60.83$ |
| $r_{16} = -8.2893$ | | |

$\theta_3 = 0.5373 \quad \theta_4 = 0.5919 \quad \theta_5 = 0.5623 \quad \theta_6 = 0.5309$ $\dfrac{\theta_4 - \theta_3}{\nu_3 - \nu_4} = 0.000861 \qquad \dfrac{\theta_5 - \theta_6}{\nu_6 - \nu_5} = 0.000825$ wherein the reference symbols $r_1$ through $r_{16}$ represent radii of curvature on the surfaces of the respective lens elements, the reference symbols $d_1$ through $d_{15}$ designate thickness of the respective lens elements and airspaces therebetween, the reference symbols $n_1$ through $n_{10}$ denote refractive indices of the respective lens elements and the reference symbols $\nu_1$ through $\nu_{10}$ represent Abbe's numbers of the respective lens elements.

Of the embodiments described above, the first lens component consists of a single element in Embodiment 1. However, the first lens component is relatively thick and, therefore, should preferably be designed as a cemented doublet which facilitates correction of aberrations. In all the embodiments, the first lens component, the third lens component, the fourth lens component and the sixth lens component are important for accomplishing the object of the present invention. It is therefore possible to design an objective lens system which can successfully accomplish the object of the present invention by properly selecting radii of curvature on the respective surfaces and materials within such ranges as to satisfy the above-mentioned conditions only for the first, third, fouth and sixth lens components without using the other lens components, i.e., the second and fifth lens components.

I claim:

1. An objective lens system for microscopes comprising a first meniscus lens component having a concave surface on the object side and positive refractive power, a second positive lens component, a third cemented meniscus lens component having a concave surface on the image side, a fourth cemented meniscus lens component having a concave surface on the object side, a fifth positive lens component and a sixth cemented three-element lens component, and said lens system satisfying the following conditions:

$$1.85 > n_1 > 1.70 \tag{1}$$

$$100 < (\nu_3 - \nu_4) + (\nu_6 - \nu_5) < 103 \tag{2}$$

$$0 \leq \dfrac{\theta_4 - \theta_3}{\nu_3 - \nu_4} \leq 0.001 \,,\, 0 \leq \dfrac{\theta_5 - \theta_6}{\nu_6 - \nu_5} \leq 0.001 \tag{3}$$

$$0.1f < d_1/n_1 < 0.3f \tag{4}$$

wherein the reference symbol $d_1$ represents thickness of the first lens component, the reference symbol $n_1$ designates refractive index of the first lens component, the reference symbols $\nu_3$, $\nu_4$, $\nu_5$ and $\nu_6$ denote Abbe's numbers of both the elements of the third lens component and both the elements of the fourth lens component respectively, the reference symbols $\theta_3$, $\theta_4$, $\theta_5$ and $\theta_6$ represent values of $\theta$ given by $\theta = (n_g - n_F)/(n_F - n_C)$ for both the elements of the third lens component and both the elements of the fourth lens component respectively and the reference symbol f designates focal length of the lens system as a whole.

2. An objective lens system for microscopes according to claim 1 so adapted as to satisfy additionally the following conditions:

$$0.5 < r_7/r_5 < 0.7 \quad (5)$$

$$0.45 < r_8/r_{10} < 0.55$$

$$1.4 \leq \left(\frac{n_1 - 1}{-r_1}\right) f \leq 2.7 \quad (6)$$

wherein the reference symbols $r_1$, $r_5$, $r_7$, $r_8$ and $r_{10}$ represent radii of curvature on the object side surface of the first lens component, the object side surface and image side surface of the third lens component, and the object side surface and image side surface of the fourth lens component respectively, the reference symbol $n_1$ designates refractive index of the first lens component and the reference symbol f denotes focal length of the lens system as a whole.

3. An objective lens system for microscopes according to claim 1 having the following numerical data:

| f = 1.0 | N.A = 0.4 | β = −10X | W.D = 0.1329 |
|---|---|---|---|
| $r_1 = -0.5294$ | | | |
| | $d_1 = 0.4089$ | $n_1 = 1.78472$ | $\nu_1 = 25.71$ |
| $r_2 = -0.4307$ | | | |
| | $d_2 = 0.0109$ | | |
| $r_3 = 0.4276$ | | | |
| | $d_3 = 0.1254$ | $n_2 = 1.49700$ | $\nu_2 = 81.60$ |
| $r_4 = -1.1198$ | | | |
| | $d_4 = 0.0055$ | | |
| $r_5 = 0.3756$ | | | |
| | $d_5 = 0.1336$ | $n_3 = 1.43389$ | $\nu_3 = 95.15$ |
| $r_6 = -0.5628$ | | | |
| | $d_6 = 0.1189$ | $n_4 = 1.74000$ | $\nu_4 = 31.70$ |
| $r_7 = 0.2541$ | | | |
| | $d_7 = 0.2950$ | | |
| $r_8 = -0.2112$ | | | |
| | $d_8 = 0.1472$ | $n_5 = 1.61340$ | $\nu_5 = 43.84$ |
| $r_9 = 6.7503$ | | | |
| | $d_9 = 0.1854$ | $n_6 = 1.49700$ | $\nu_6 = 81.60$ |
| $r_{10} = -0.3958$ | | | |
| | $d_{10} = 0.0055$ | | |
| $r_{11} = \infty$ | | | |
| | $d_{11} = 0.2170$ | $n_7 = 1.70154$ | $\nu_7 = 41.10$ |
| $r_{12} = -0.7421$ | | | |
| | $d_{12} = 0.0055$ | | |
| $r_{13} = 2.8442$ | | | |
| | $d_{13} = 0.1439$ | $n_8 = 1.64250$ | $\nu_8 = 58.37$ |
| $r_{14} = 0.8101$ | | | |
| | $d_{14} = 0.2181$ | $n_9 = 1.43389$ | $\nu_9 = 95.15$ |
| $r_{15} = -0.8301$ | | | |
| | $d_{15} = 0.1058$ | $n_{10} = 1.61340$ | $\nu_{10} = 43.84$ |
| $r_{16} = -3.5977$ | | | |
| $\theta_3 = 0.5373$ | $\theta_4 = 0.5919$ | $\theta_5 = 0.5624$ | $\theta_6 = 0.539$ |
| $\frac{\theta_4 - \theta_3}{\nu_3 - \nu_4} = 0.000861$ | | $\frac{\theta_5 - \theta_6}{\nu_6 - \nu_5} = 0.000617$ | | wherein the reference symbols $r_1$ through $r_{16}$ represent radii of curvature on the surfaces of the respective lens elements, the reference symbols $d_1$ through $d_{15}$ designate thicknesses of the respective lens elements and airspaces therebetween, the reference symbols $n_1$ through $n_{10}$ denote refractive indices of the respective lens elements, the reference symbols $\nu_1$ through $\nu_{10}$ represent Abbe's numbers of the respective lens elements and the reference symbol f represents focal length of the lens system as a whole.

4. An objective lens system for microscopes according to claim 1 having the following numerical data:

| f = 1.0 | N.A = 0.4 | β = −10X | W.D = 0.0594 |
|---|---|---|---|
| $r_1 = -0.3134$ | | | |
| | $d_1 = 0.3334$ | $n_1 = 1.83400$ | $\nu_1 = 37.19$ |
| $r_2 = -0.3221$ | | | |
| | $d_2 = 0.0047$ | | |
| $r_3 = 0.3980$ | | | |
| | $d_3 = 0.0689$ | $n_2 = 1.61800$ | $\nu_2 = 63.38$ |
| $r_4 = -1.3758$ | | | |
| | $d_4 = 0.0047$ | | |
| $r_5 = 0.3176$ | | | |
| | $d_5 = 0.1139$ | $n_3 = 1.43389$ | $\nu_3 = 95.15$ |
| $r_6 = -0.5555$ | | | |
| | $d_6 = 0.1749$ | $n_4 = 1.74000$ | $\nu_4 = 31.70$ |
| $r_7 = 0.1767$ | | | |
| | $d_7 = 0.2366$ | | |
| $r_8 = -0.2089$ | | | |
| | $d_8 = 0.1682$ | $n_5 = 1.61340$ | $\nu_5 = 43.84$ |
| $r_9 = 1.0102$ | | | |
| | $d_9 = 0.0913$ | $n_6 = 1.49700$ | $\nu_6 = 81.60$ |
| $r_{10} = -0.4309$ | | | |
| | $d_{10} = 0.0248$ | | |
| $r_{11} = 5.0559$ | | | |
| | $d_{11} = 0.1263$ | $n_7 = 1.53256$ | $\nu_7 = 45.91$ |
| $r_{12} = -0.4836$ | | | |
| | $d_{12} = 0.0047$ | | |
| $r_{13} = 6.7301$ | | | |
| | $d_{13} = 0.1942$ | $n_8 = 1.61340$ | $\nu_8 = 43.84$ |
| $r_{14} = 0.6681$ | | | |
| | $d_{14} = 0.2792$ | $n_9 = 1.43389$ | $\nu_9 = 95.15$ |
| $r_{15} = -2.1199$ | | | |
| | $d_{15} = 0.1015$ | $n_{10} = 1.61340$ | $\nu_{10} = 43.84$ |
| $r_{16} = -1.2523$ | | | |
| $\theta_3 = 0.5373$ | $\theta_4 = 0.5919$ | $\theta_5 = 0.5623$ | $\theta_6 = 0.539$ |
| $\frac{\theta_4 - \theta_3}{\nu_3 - \nu_4} = 0.000861$ | | $\frac{\theta_5 - \theta_6}{\nu_6 - \nu_5} = 0.000617$ | | wherein the reference symbols $r_1$ through $r_{16}$ represent radii of curvature on the surfaces of the respective lens elements, the reference symbols $d_1$ through $d_{15}$ designate thicknesses of the respective lens elements and airspaces therebetween, the reference symbols $n_1$ through $n_{10}$ denote refractive indices of the respective lens elements, the reference symbols $\nu_1$ through $\nu_{10}$ represent Abbe's numbers of the respective lens elements and the reference symbol f represents focal length of the lens system as a whole.

5. An objective lens system for microscopes according to claim 1 having the following numerical data:

| f = 1.0 | N.A = 0.4 | β = −10X | W.D = 0.0988 |
|---|---|---|---|
| $r_1 = -0.3679$ | | | |
| | $d_1 = 0.2882$ | $n_1 = 1.78472$ | $\nu_1 \; 32 \; 25.71$ |
| $r_2 = -0.3149$ | | | |
| | $d_2 = 0.0048$ | | |
| $r_3 = 0.5580$ | | | |
| | $d_3 = 0.0703$ | $n_2 = 1.49700$ | $\nu_4 = 81.60$ |
| $r_4 = -0.6240$ | | | |
| | $d_4 = 0.0048$ | | |
| $r_5 = 0.2822$ | | | |
| | $d_5 = 0.1176$ | $n_3 = 1.43389$ | $\nu_3 = 95.15$ |
| $r_6 = -0.8253$ | | | |
| | $d_6 = 0.1755$ | $n_4 = 1.74000$ | $\nu_4 = 31.70$ |
| $r_7 = 0.1871$ | | | |
| | $d_7 = 0.2453$ | | |
| $r_8 = -0.1766$ | | | |
| | $d_8 = 0.1619$ | $n_5 = 1.61340$ | $\nu_5 = 43.84$ |
| $r_9 = 2.9619$ | | | |
| | $d_9 = 0.1101$ | $n_6 = 1.49700$ | $\nu_6 = 81.60$ |
| $r_{10} = -0.3457$ | | | |
| | $d_{10} = 0.0520$ | | |
| $r_{11} = -2.9619$ | | | |
| | $d_{11} = 0.1251$ | $n_7 = 1.63930$ | $\nu_7 = 44.88$ |

-continued $r_{12} = -0.5082$
$\quad d_{12} = 0.0048$
$r_{13} = -3.4302$
$\quad d_{13} = 0.1942 \quad n_8 = 1.61340 \quad \nu_8 = 43.84$
$r_{14} = 0.9256$
$\quad d_{14} = 0.2818 \quad n_9 = 1.43389 \quad \nu_9 = 95.15$
$r_{15} = -0.7013$
$\quad d_{15} = 0.0934 \quad n_{10} = 1.61340 \quad \nu_{10} = 43.84$
$r_{16} = -1.6404$
$\theta_3 = 0.5373 \quad \theta_4 = 0.5919 \quad \theta_5 = 0.5623 \quad \theta_6 = 0.539$
$\dfrac{\theta_4 - \theta_3}{\nu_3 - \nu_4} = 0.000861 \qquad \dfrac{\theta_5 - \theta_6}{\nu_6 - \nu_5} = 0.000617$ wherein the reference symbols $r_1$ through $r_{16}$ represent radii of curvature on the surfaces of the respective lens elements, the reference symbols $d_1$ through $d_{15}$ designate thicknesses of the respective lens elements and airspaces therebetween, the reference symbols $n_1$ through $n_{10}$ denote refractive indices of the respective lens elements, the reference symbols $\nu_1$ through $\nu_{10}$ represent Abbe's numbers of the respective lens elements and the reference symbol f represents focal length of the lens system as a whole.

6. An objective lens system for microscopes according to claim 1 having the following numerical data:

$f = 1.0 \quad N.A = 0.4 \quad \beta = -10X \quad W.D = 0.1316$
$r_1 = -0.4015$
$\quad d_1 = 0.2700 \quad n_1 = 1.83400 \quad \nu_1 = 37.19$
$r_2 = -0.3474$
$\quad d_2 = 0.0047$
$r_3 = 0.7427$
$\quad d_3 = 0.0698 \quad n_2 = 1.61800 \quad \nu_2 = 63.38$
$r_4 = -0.6625$
$\quad d_4 = 0.0047$
$r_5 = 0.2833$
$\quad d_5 = 0.1168 \quad n_3 = 1.43389 \quad \nu_3 = 95.15$
$r_6 = -0.9889$
$\quad d_6 = 0.1889 \quad n_4 = 1.74000 \quad \nu_4 = 31.70$
$r_7 = 0.1889$
$\quad d_7 = 0.2347$
$r_8 = -0.1799$
$\quad d_8 = 0.1720 \quad n_5 = 1.61340 \quad \nu_5 = 43.84$
$r_9 = 3.1662$
$\quad d_9 = 0.1213 \quad n_6 = 1.49700 \quad \nu_6 = 81.60$
$r_{10} = -0.3677$
$\quad d_{10} = 0.0654$
$r_{11} = -3.0360$
$\quad d_{11} = 0.1334 \quad n_7 = 1.63930 \quad \nu_7 = 44.88$
$r_{12} = -0.5407$
$\quad d_{12} = 0.0047$
$r_{13} = 3.2530$
$\quad d_{13} = 0.1903 \quad n_8 = 1.61340 \quad \nu_8 = 43.84$
$r_{14} = 0.8986$
$\quad d_{14} = 0.2815 \quad n_9 = 1.43389 \quad \nu_9 = 95.15$
$r_{15} = -0.8299$
$\quad d_{15} = 0.0976 \quad n_{10} = 1.61340 \quad \nu_{10} = 43.84$
$r_{16} = -1.8259$
$\theta_3 = 0.5373 \quad \theta_4 = 0.5919 \quad \theta_5 = 0.5623 \quad \theta_6 = 0.539$ -continued $\dfrac{\theta_4 - \theta_3}{\nu_3 - \nu_4} = 0.000861 \qquad \dfrac{\theta_5 - \theta_6}{\nu_6 - \nu_5} = 0.000617$ wherein the reference symbols $r_1$ through $r_{16}$ represent radii of curvature on the surfaces of the respective lens elements, the reference symbols $d_1$ through $d_{15}$ designate thicknesses of the respective lens elements and airspaces therebetween, the reference symbols $n_1$ through $n_{10}$ denote refractive indices of the respective lens elements, the reference symbols $\nu_1$ through $\nu_{10}$ represent Abbe's numbers of the respective lens elements and the reference symbol f represents focal length of the lens system as a whole.

7. An objective lens system for microscopes according to claim 1 having the following numerical data:

$f = 1.0 \quad N.A = 0.4 \quad \beta = -10X \quad W.D = 0.1859$
$r_1 = -0.5430$
$\quad d_1 = 0.2793 \quad n_1 = 1.83400 \quad \nu_1 = 37.19$
$r_2 = -0.4589$
$\quad d_2 = 0.0052$
$r_3 = 0.6334$
$\quad d_3 = 0.0775 \quad n_2 = 1.68600 \quad \nu_2 = 49.16$
$r_4 = -1.0351$
$\quad d_4 = 0.0052$
$r_5 = 0.3401$
$\quad d_5 = 0.1293 \quad n_3 = 1.43389 \quad \nu_3 = 95.15$
$r_6 = -0.9055$
$\quad d_6 = 0.2021 \quad n_4 = 1.74000 \quad \nu_4 = 31.70$
$r_7 = 0.2134$
$\quad d_7 = 0.2448$
$r_8 = -0.1940$
$\quad d_8 = 0.1668 \quad n_5 = 1.61340 \quad \nu_5 = 43.84$
$r_9 = 2.6890$
$\quad d_9 = 0.1160 \quad n_6 = 1.49250 \quad \nu_6 = 81.90$
$r_{10} = -0.3873$
$\quad d_{10} = 0.0447$
$r_{11} = -5.5255$
$\quad d_{11} = 0.1243 \quad n_7 = 1.74100 \quad \nu_7 = 52.68$
$r_{12} = -0.5503$
$\quad d_{12} = 0.0052$
$r_{13} = 3.6196$
$\quad d_{13} = 0.2084 \quad n_8 = 1.64250 \quad \nu_8 = 58.37$
$r_{14} = 0.7744$
$\quad d_{14} = 0.3113 \quad n_9 = 1.49700 \quad \nu_9 = 81.60$
$r_{15} = -0.4793$
$\quad d_{15} = 0.1068 \quad n_{10} = 1.50847 \quad \nu_{10} = 60.83$
$r_{16} = -8.2893$
$\theta_3 = 0.5373 \quad \theta_4 = 0.5919 \quad \theta_5 = 0.5623 \quad \theta_6 = 0.5309$
$\dfrac{\theta_4 - \theta_3}{\nu_3 - \nu_4} = 0.000861 \qquad \dfrac{\theta_5 - \theta_6}{\nu_6 - \nu_5} = 0.000825$ wherein the reference symbols $r_1$ through $r_{16}$ represent radii of curvature on the surfaces of the respective lens elements, the reference symbols $d_1$ through $d_{15}$ designate thicknesses of the respective lens elements and airspaces therebetween, the reference symbols $n_1$ through $n_{10}$ denote refractive indices of the respective lens elements, the reference symbols $\nu_1$ through $\nu_{10}$ represent Abbe's numbers of the respective lens elements and the reference symbol f represents focal length of the lens system as a whole.

* * * * *